(12) United States Patent
Hirai

(10) Patent No.: US 7,386,742 B2
(45) Date of Patent: Jun. 10, 2008

(54) METHOD AND APPARATUS FOR CONTROLLING POWER TO A FIRST AND SECOND CIRCUIT BASED ON AN OPERATIONAL MODE AND CONNECTING STATE OF AN INFORMATION PROCESSING APPARATUS

(75) Inventor: Jun Hirai, Tokyo (JP)

(73) Assignee: Sony Corporation (JP)

( * ) Notice: Subject to any disclaimer, the term of this patent is extended or adjusted under 35 U.S.C. 154(b) by 300 days.

(21) Appl. No.: 11/147,720

(22) Filed: Jun. 8, 2005

(65) Prior Publication Data

US 2005/0264552 A1 Dec. 1, 2005

Related U.S. Application Data

(62) Division of application No. 09/856,233, filed as application No. PCT/JP00/06467 on Sep. 21, 2000, now Pat. No. 6,933,936.

(30) Foreign Application Priority Data

Sep. 22, 1999 (JP) ................................ 11-268046
Sep. 29, 1999 (JP) ................................ 11-276101

(51) Int. Cl.
*G06F 1/00* (2006.01)
*G06F 1/32* (2006.01)
*G06F 13/00* (2006.01)

(52) U.S. Cl. ................ 713/300; 713/320; 713/324; 710/100

(58) Field of Classification Search ............. 713/300, 713/310, 320, 324, 340; 323/318; 710/318
See application file for complete search history.

(56) References Cited

U.S. PATENT DOCUMENTS

| 4,922,448 A | * | 5/1990 | Kunieda et al. ............ 713/320 |
| 5,167,024 A | | 11/1992 | Smith et al. |
| 5,594,426 A | | 1/1997 | Ushijima et al. |
| 5,675,813 A | | 10/1997 | Holmdahl |
| 5,757,366 A | | 5/1998 | Suzuki |
| 5,831,351 A | * | 11/1998 | Khosrowpour et al. ..... 307/139 |
| 5,887,193 A | | 3/1999 | Takahashi et al. |
| 5,944,831 A | * | 8/1999 | Pate et al. .................. 713/324 |
| 6,055,641 A | * | 4/2000 | Konaka et al. ............. 713/320 |
| 6,151,652 A | * | 11/2000 | Kondo et al. ............... 713/300 |
| 6,425,525 B1 | * | 7/2002 | Swaminathan et al. ..... 235/385 |
| 6,473,078 B1 | | 10/2002 | Ilonen et al. |

(Continued)

FOREIGN PATENT DOCUMENTS

| JP | 7-175557 | | 7/1995 |
| JP | 10-155121 | | 6/1998 |
| JP | 10-233791 | | 9/1998 |
| JP | 10233971 A | * | 9/1998 |
| JP | 2001042975 A | * | 2/2001 |
| JP | 2001337752 A | * | 12/2001 |
| WO | WO-98/25377 A1 | | 6/1998 |

*Primary Examiner*—Mark Connolly
(74) *Attorney, Agent, or Firm*—Lerner, David, Littenberg, Krumholz & Mentlik, LLP

(57) ABSTRACT

An information processing apparatus is connectable to a bus that is connected to a further apparatus. A detecting circuit detects whether the bus is connected to the information processing apparatus. When the detecting circuit detects that the bus is connected to the information processing apparatus, a control circuit controls a power supply circuit such that the power supply circuit provides power to a further circuit. When the detecting circuit detects that the bus is not connected to the information processing apparatus, the control circuit controls the power supply circuit such that the power supply circuit does not provide the power to the further circuit.

23 Claims, 9 Drawing Sheets

U.S. PATENT DOCUMENTS

| | | |
|---|---|---|
| 6,480,889 B1 | 11/2002 | Saito et al. |
| 6,554,490 B1 * | 4/2003 | Sumi et al. ................... 385/88 |
| 6,928,562 B2 * | 8/2005 | Cohen et al. ............... 713/320 |
| 7,072,989 B1 * | 7/2006 | Kolokowsky et al. ......... 710/8 |
| 2002/0138776 A1 * | 9/2002 | Cohen et al. ............... 713/320 |
| 2004/0156151 A1 * | 8/2004 | Morrow ....................... 361/18 |

* cited by examiner

Fig. 10

| | STANDBY (DISCONNECTION) | STANDBY (CONNECTION) | POWER ON | POWER OFF |
|---|---|---|---|---|
| PHYSICAL CONNECTING CIRCUIT | × | ○ | ○ | × |
| LOGICAL CONNECTING CIRCUIT | × | ○ | ○ | × |
| SIGNAL PROCESSING CIRCUIT | × | × | ○ | × |
| STANDBY CONTROL CIRCUIT | ○ | ○ | ○ | × |
| MAIN CONTROL CIRCUIT | × | ○ | ○ | × |
| STANDBY POWER SUPPLYING CIRCUIT | ○ | ○ | ○ | × |
| CONNECTION DETECTING CIRCUIT | | ○ | ○ | × |

METHOD AND APPARATUS FOR CONTROLLING POWER TO A FIRST AND SECOND CIRCUIT BASED ON AN OPERATIONAL MODE AND CONNECTING STATE OF AN INFORMATION PROCESSING APPARATUS

CROSS-REFERENCE TO RELATED APPLICATIONS

This application is a divisional of U.S. application Ser. No. 09/856,233, filed Aug. 16, 2001, now U.S. Pat. No. 6,933,936 which is the National Stage of International Application No. PCT/JP00/06467, filed Sep. 21, 2000, the disclosures of which are incorporated herein by reference.

BACKGROUND OF THE INVENTION

The invention relates to an information processing apparatus, a display control method, and a recording medium. More particularly, the invention relates to an information processing apparatus and a power control method in which standby electric power is supplied to only a corresponding circuit from a connecting state of the IEEE1394 serial bus.

In recent years, even in an ordinary home, digital apparatuses such as a D-VTR (Digital Video Tape Recorder) for recording digital broadcast and the like are being spread. In association with it, the operation such that the digital broadcast is received and outputted to a television receiver and the digital broadcast is monitored or the operation such that the digital broadcast is transferred to the D-VTR and recorded as a digital signal as it is can be easily performed.

For example, the IEEE (The Institute of Electrical and Electronics Engineers) 1394 serial bus having a high degree of freedom of connection and high durability is used for mutual connection of the digital apparatuses.

According to the IEEE1394 serial bus, even when a power source of the electronic apparatus connected thereto is in a standby mode, the power source of the electronic apparatus can be turned on by sending a command. Each electronic apparatus, therefore, is set to the standby mode and a current is always supplied to the apparatus.

However, when the power source of the electronic apparatus is OFF (disconnecting state), since no command can be received, the existence of the electronic apparatus cannot be recognized. Further, there is a problem such that when the number of electronic apparatuses connected to a network increases, it is difficult to distinguish the electronic apparatus in the standby mode including a power-on state from the electronic apparatus in the disconnecting state.

Therefore, although there is a method of always setting the power sources of all of the electronic apparatuses connected to the network into the standby mode, an electric power is supplied even to the electronic apparatus whose use frequency is low, so that there is a problem such that a large electric power (standby electric power) is eventually consumed.

There is also a problem such that since the IEEE1394 serial bus communicates with many apparatuses, in the apparatuses connected to the bus, it is necessary to make many circuits operative and, since the apparatus operates at a high speed, a large electric power (standby electric power) is consumed even in the standby mode.

SUMMARY OF THE INVENTION

According to an aspect of the invention, an information processing apparatus is connectable to a bus, the bus being connected to a further apparatus. The information processing apparatus includes a detecting circuit operable to detect whether the bus is connected to the information processing apparatus, a first control circuit, and a further circuit. The first control circuit is operable to control a power supply circuit such that the power supply circuit provides power to the further circuit when the detecting circuit detects that the bus is connected to the information processing apparatus and does not provide power to the further circuit when the detecting circuit detects that the bus is not connected to the information processing apparatus.

In accordance with this aspect of the invention, the detecting circuit may be operable to detect whether the bus is connected to the information processing apparatus by detecting a bias voltage. The detecting circuit may be further operable to send a detection signal to the first control circuit when the detecting circuit detects that the bus is connected to the information processing apparatus. The information processing apparatus may include the power supply circuit.

The further circuit may include at least one circuit selected from the group consisting of: a physical connecting circuit operable to receive incoming data from the bus and to transmit outgoing data to the bus, a logical connecting circuit operable to convert the incoming data into an incoming signal and to convert an outgoing signal into the outgoing data, and a standby control circuit operable to receive at least part of the incoming signal and to output a signal corresponding to the part of the incoming signal to the first control circuit. The bus may be an IEEE1394 serial bus, and the physical connecting circuit may be an IEEE1394 interface. The logical connecting circuit may be operable to convert the incoming data into a video signal, an audio signal, and a control signal. The standby control circuit may be operable to receive the control signal and to output a signal corresponding to the control signal. The information processing apparatus may include a signal processing circuit operable to process the video signal and the audio signal, and the first control circuit may be further operable to control the power supply circuit such that the power supply circuit provides power to the signal processing circuit when the first control circuit receives an instruction to initiate a power-on mode and terminates the power to the signal processing circuit when the first control circuit receives an instruction to terminate the power-on mode.

Another aspect of the invention is a method of controlling power within an information processing apparatus that is connectable to a bus, the bus being connected to a further apparatus. The method includes: detecting whether the bus is connected to the information processing apparatus, and controlling a power supply circuit such that the power supply circuit provides power to a given circuit located within the information processing apparatus to carry out a further step when the bus is connected to the information processing apparatus and does not provide the power to the given circuit when the bus is not connected to the information processing apparatus.

In accordance with this aspect of the invention, the detecting step may include detecting a bias voltage. The method may include generating a detection signal when the detection step detects that the bus is connected to the information processing apparatus.

The further step may include at least one step selected from the group consisting of: receiving incoming data from the bus, converting the incoming data into an incoming signal, generating a signal corresponding to a part of the incoming signal, converting an outgoing signal into outgoing data, and transmitting the outgoing data to the bus. The incoming data may be converted into a video signal, an audio signal, and a control signal. The generating step may include generating a signal corresponding to the control signal. The method may include providing power to a further circuit located within the information processing apparatus to process the video signal and the audio signal when an instruction to initiate a power-on mode is received, and terminating the power to the further circuit when an instruction to terminate the power-on mode is received.

According to a further aspect of the invention, a recording medium is recorded with a program for carrying out the method described above.

The foregoing aspects, features and advantages of the present invention will be further appreciated when considered with reference to the following detailed description and accompanying drawings.

BRIEF DESCRIPTION OF THE DRAWINGS

FIG. 10 is a diagram for explaining a supply of an electric power to each circuit corresponding to a connecting state of a bus.

DETAILED DESCRIPTION

Figure 1:
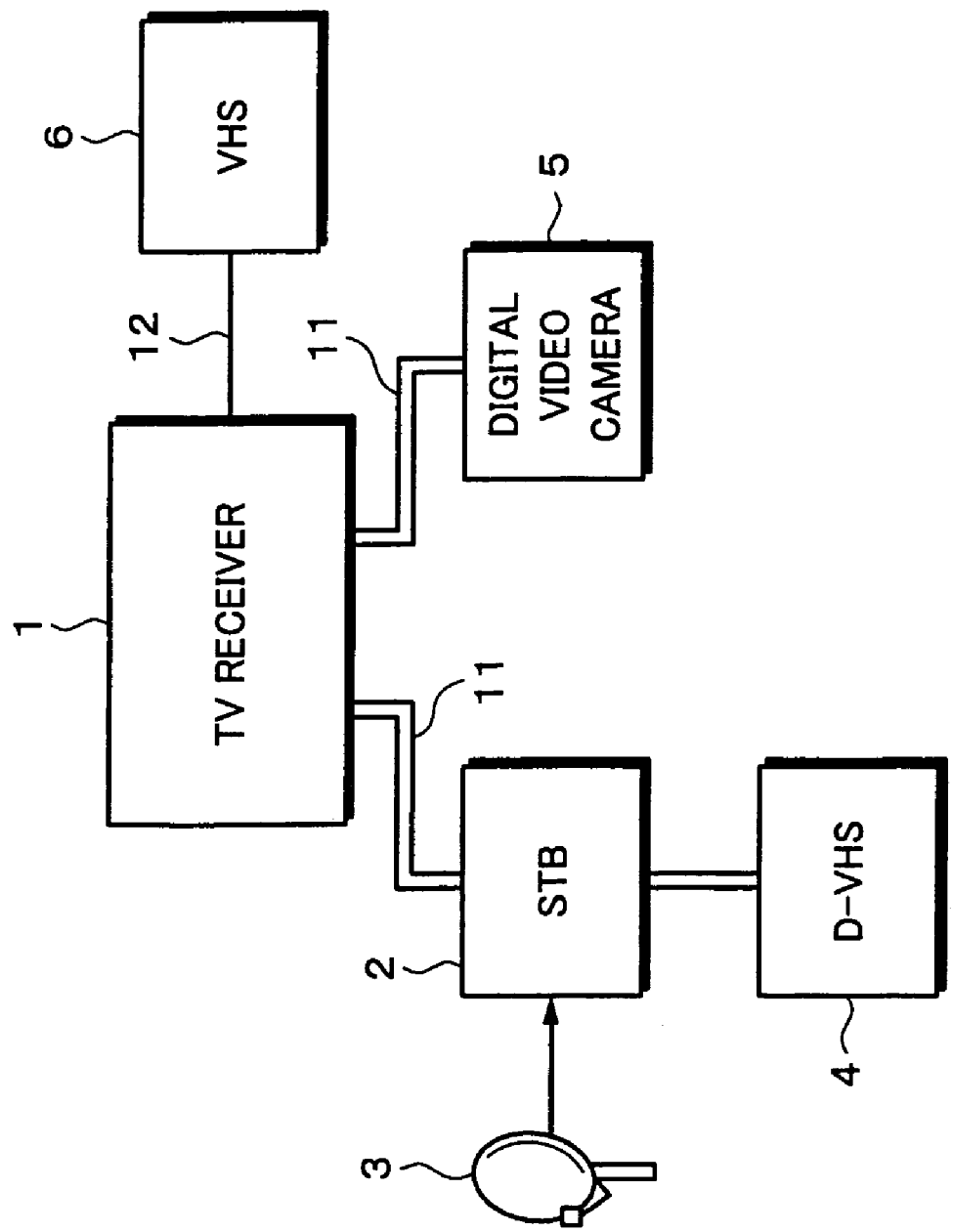
FIG. 1 is a block diagram showing a construction of a network system to which the invention is applied.

FIG. 1 shows a constructional example of a network system to which the invention is applied. A television receiver 1 is connected to an STB (Set Top Box) 2 through an IEEE1394 serial bus 11. The STB 2 is connected to a D-VHS (Digital Video Home System) (trademark) 4 as a digital video tape recorder through the IEEE1394 serial bus 11. The STB 2 demodulates a signal of a predetermined channel from a reception signal of a satellite broadcast wave received by a parabolic antenna 3.

A digital video camera 5 is connected to the television receiver 1 through the IEEE1394 serial bus 11. A VHS 6 as an analog video tape recorder is also connected to the TV receiver 1 through an analog cord 12.

Figure 2:
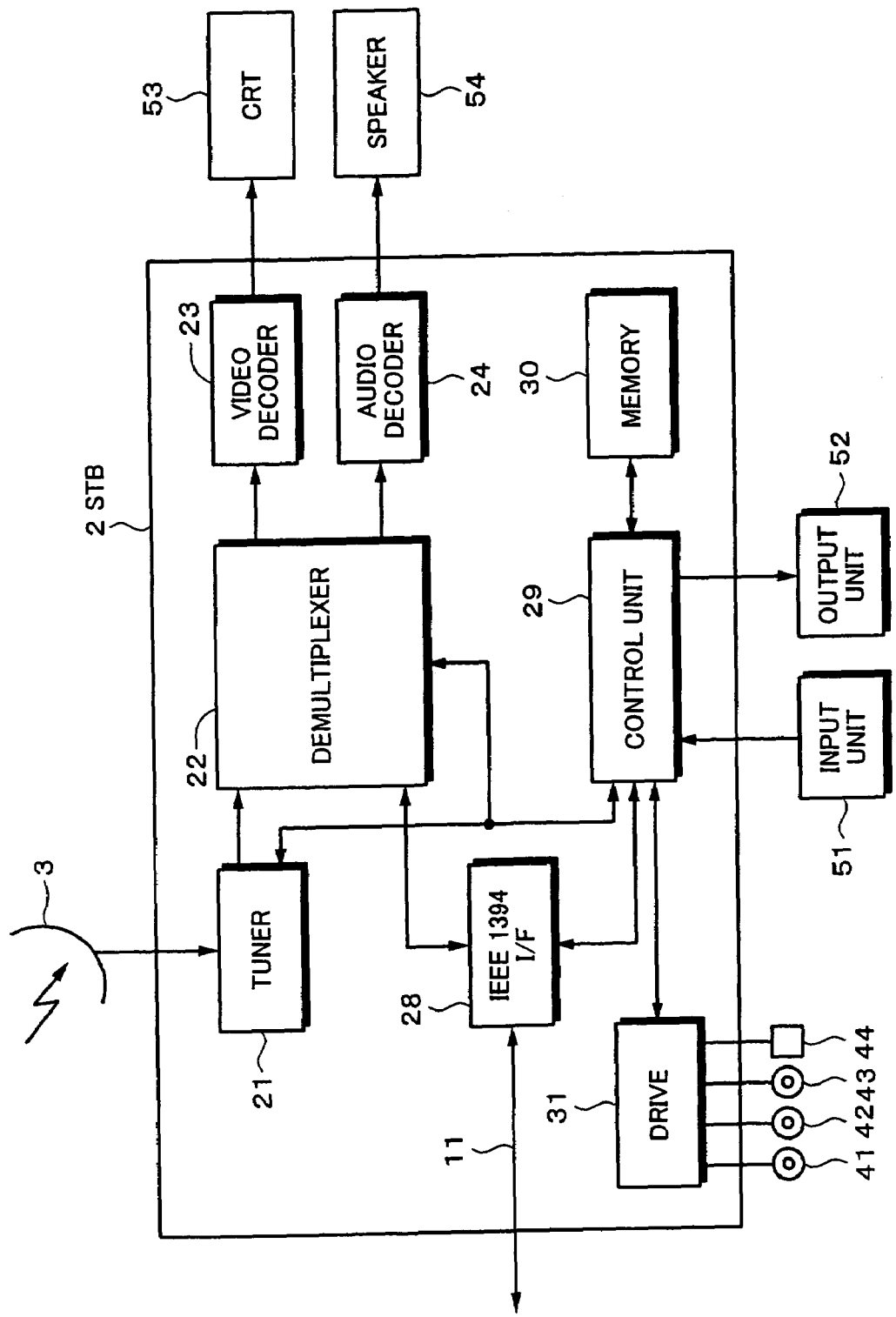
FIG. 2 is a block diagram showing a constructional example of an STB 2 in FIG. 1.

The STB 2 is constructed as shown in, for example, FIG. 2. A tuner 21 receives a signal of a predetermined transmission channel (transmission channel including a broadcast channel instructed from a control unit 29) from the reception signal of the broadcast wave received by the parabolic antenna 3 on the basis of a command from the control unit 29 and outputs it to a demultiplexer 22.

The demultiplexer 22 extracts the signal of a predetermined broadcast channel from the inputted signal of the transmission channel on the basis of a command from a control unit 29, outputs a video signal in the extracted signal to a video decoder 23, and outputs an audio signal to an audio decoder 24, respectively. The demultiplexer 22 also extracts a signal of a desired broadcast channel to be recorded and supplies it to an IEEE1394 interface (I/F) 28.

If the supplied video signal has been compressed by an MPEG (Moving Picture Experts Group) format or the like, the video decoder 23 decompresses it, corrects a delay time between an audio sound and a video image due to the compression and decompression, and outputs the video signal to a CRT (Cathode Ray Tube) 53. If the supplied audio signal has been compressed, the audio decoder 24 decompresses it and outputs it as an analog audio signal to a speaker 54. The CRT 53 displays a video image corresponding to the input video signal. The speaker 54 reproduces the input audio sound.

The IEEE1394 interface 28 outputs the signal supplied from the demultiplexer 22 to the IEEE1394 serial bus 11 and supplies the signal from the IEEE1394 serial bus 11 to the demultiplexer 22.

The control unit 29 controls the tuner 21, demultiplexer 22, and memory 30 on the basis of a command from an input unit 51. The control unit 29 allows a category of the apparatus, a name of a manufacturer, a function, a node unique ID, and the like as specification (property) information of each of the digital apparatuses (television receiver 1, D-VHS 4, and digital video camera 5) which is inputted from the IEEE1394 interface 28 through the IEEE1394 serial bus 11 to be stored into a memory table in the memory 30. The VHS 6 as an analog apparatus cannot be directly connected to the IEEE1394 serial bus 11 as a digital bus. Thus, the IEEE1394 interface 28 cannot detect the VHS 6. Accordingly, the user operates the input unit 51, so that the property information of the VHS is directly inputted.

The input unit 51 is constructed by, for example, a remote commander or the like and operated by the user when the user inputs various commands to the control unit 29. An output unit 52 is constructed by, for example, an LCD (Liquid Crystal Display) or the like, selects a predetermined type from the memory table stored in the memory 30 on the basis of a command from the control unit 29 and displays it. A magnetic disk 41, an optical disk 42, a magnetooptic disk 43, a semiconductor memory 44, or the like can be inserted into a drive 31.

Figure 3:
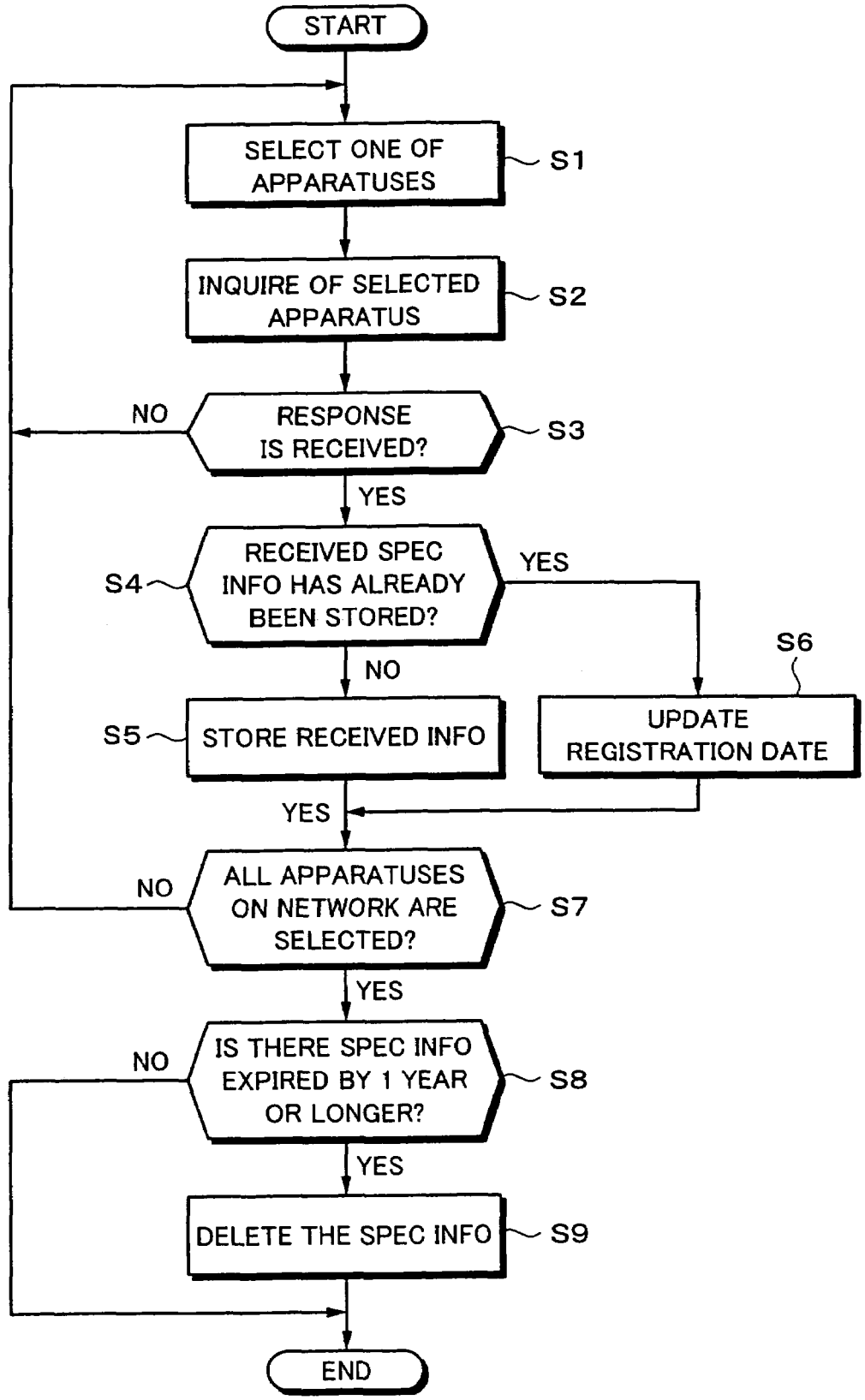
FIG. 3 is a flowchart for explaining a specification information collecting process.

The specification information collecting process which is executed every bus reset will now be described with reference to a flowchart of FIG. 3.

In step S1, the control unit 29 selects one of the digital apparatuses connected to the network. In step S2, the control unit 29 inquires the apparatus selected in step S1 of the property information of the apparatus from the IEEE1394 interface 28 through the IEEE1394 serial bus 11.

In step S3, the control unit 29 discriminates whether a response has been received from the apparatus inquired in step S2 or not. If it is determined that no response is received, the processing routine is returned to step S1 and the foregoing processes are repeated. If it is decided in step S3 that the response has been received, step S4 follows and the control unit 29 discriminates whether the received property information has already been recorded in the memory table in the memory 30 or not.

If it is determined in step S4 that the property information is not recorded in the memory table yet, step S5 follows. The control unit 29 allows the received property information to be stored into the memory table in the memory 30 together with the date. If it is decided in step S4 that the received property information has already been stored in the memory table, step S6 follows. The control unit 29 updates the date of the registration of the corresponding property information stored in the memory table in the memory 30.

After the process in step S5 or S6, the control unit 29 discriminates whether all of the digital apparatuses connected to the network have been selected or not in step S7. If it is determined that all of the apparatuses are not selected yet, the processing routine is returned to step S1 and the foregoing processes are repeated.

If it is determined in step S7 that all of the digital apparatuses connected to the network have been selected, step S8 follows. The control unit 29 discriminates whether the property information whose registration date has expired by one year or more exists in the property information stored in the memory table in the memory 30 or not. If it is decided that the property information whose registration date has expired by one year or more, step S9 follows. The control unit 29 deletes the property information whose registration date has expired by one year or more exists from the property information stored in the memory table in the memory 30. The processing routine is finished. If it is decided in step S8 that the property information whose registration date has expired by one year or more does not exist, the process in step S9 is skipped. The processing routine is finished.

Although whether the registration date has expired by one year or more or not is discriminated in the above example, the number of days in such a case can be arbitrarily set.

Figure 4:
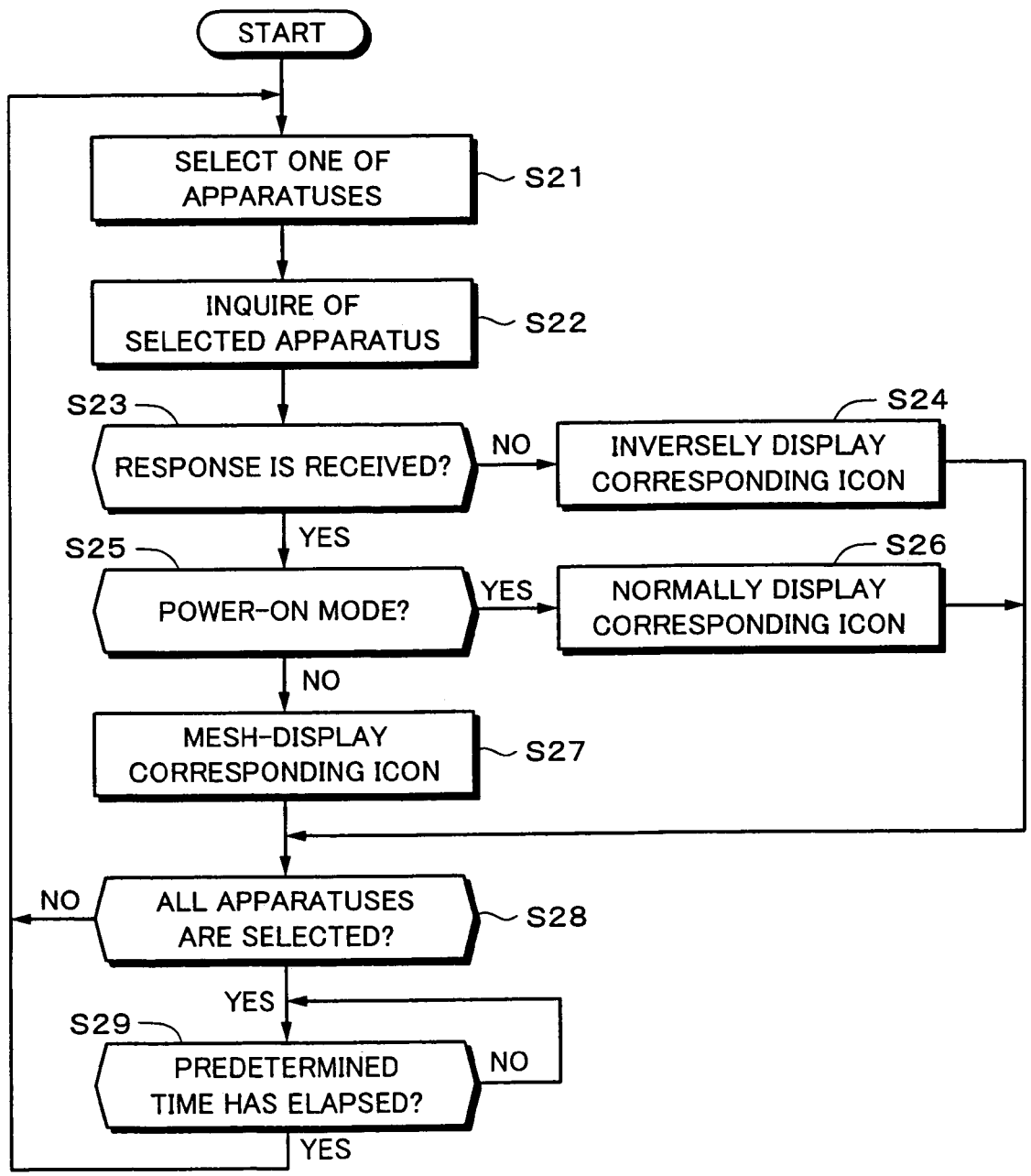
FIG. 4 is a flowchart for explaining a power managing process.

The power managing process which is executed every predetermined time will now be described with reference to a flowchart of FIG. 4.

Figure 5:
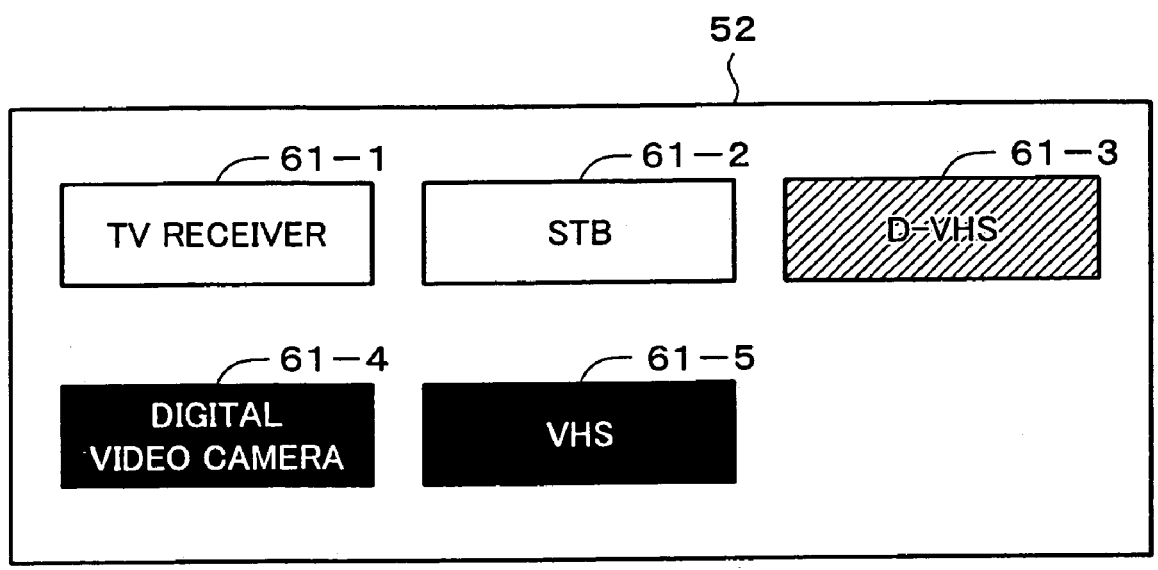
FIG. 5 is a diagram for explaining icons 61-1 to 61-5 which are displayed on an output unit 52 in FIG. 2.

In step S21, the control unit 29 selects one of the digital apparatuses (property information) stored in the memory table in the memory 30. In step S22, the control unit 29 inquires the apparatus selected in step S21 of a power supply mode of such an apparatus through the IEEE1394 serial bus 11 from the IEEE1394 interface 28. In step S23, the control unit 29 discriminates whether a response has been received from the apparatus inquired in step S22 or not, that is, whether the connecting state is in the disconnection mode (since the apparatus whose power source is OFF can neither receive an inquiry nor return the response, when no response is returned, it is determined that the apparatus is in the disconnection mode) or not. If it is decided that no response is received, step S24 follows. The control unit 29 selects the tape of apparatus from the property information stored in the memory table in the memory 30 and allows the icon corresponding to the apparatus whose mode has been determined as a disconnection mode to be inversion-displayed on the output unit 52. For example, as shown in FIG. 5, if the apparatus is the digital video camera 5, an icon 61-4 corresponding thereto is inversion-displayed.

If it is decided in step S23 that the response has been received, step S25 follows. The control unit 29 discriminates whether the power supply mode of the received response is a power-on mode or not. If it is decided that the power supply mode is the power-on mode, step S26 follows. The control unit 29 selects the type of such an apparatus from the property information stored in the memory table in the memory 30 and allows the icon corresponding to such an apparatus which has been determined to be the power supply mode to be normally displayed on the output unit 52. For example, as shown in FIG. 5, if the apparatus is the television receiver 1, the icon 61-1 corresponding to it is normally displayed.

If it is determined in step S25 that the power supply mode of the response is not the power-on mode, step S27 follows. Since the power supply mode of the response is the connection standby mode (standby mode in which although a main power switch is ON, a sub power switch is OFF), the control unit 29 selects the type of such an apparatus from the property information stored in the memory table in the memory 30 and allows the icon corresponding to the apparatus whose power supply mode has been determined to be the connection standby mode to be mesh-displayed on the output unit 52. For example, if the apparatus is the D-VHS 4 as shown in FIG. 5, the icon 61-3 corresponding to such an apparatus is mesh-displayed.

After the processes in steps S24, S26, and S27, the control unit 29 discriminates whether all of the digital apparatuses stored in the memory table in the memory 30 have been selected or not in step S28. If it is determined that all of the digital apparatuses are not selected yet, the processing routine is returned to step S21 and the foregoing subsequent processes are repeated. If it is determined in step S28 that all of the digital apparatuses have been selected, the processing routine advances to step S29 and the control unit 29 discriminates whether a predetermined time has elapsed or not. If it is decided that the predetermined time does not elapse, the apparatus waits until it is determined that the predetermined time has elapsed in step S29. The predetermined time can be arbitrarily set. If it is decided that the predetermined time has elapsed, the processing routine is returned to step S21 and the foregoing processes are repeated. In the example of FIG. 5, further, the self icon 61-2 is normally displayed and the icon 61-5 of the VHS 6 is inversion-displayed.

As mentioned above, since the power supply mode is inquired every predetermined time and the corresponding icon is displayed on the basis of its response, the user can easily confirm the power supply mode of each apparatus from the display state of the icon.

Figure 6A:
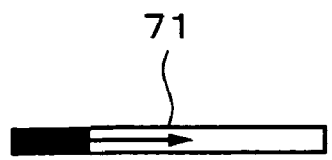
FIG. 6 is a diagram for explaining bar graphs.
Figure 6B:
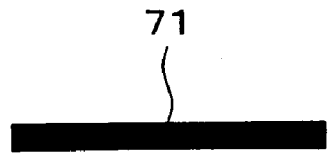
Figure 7:
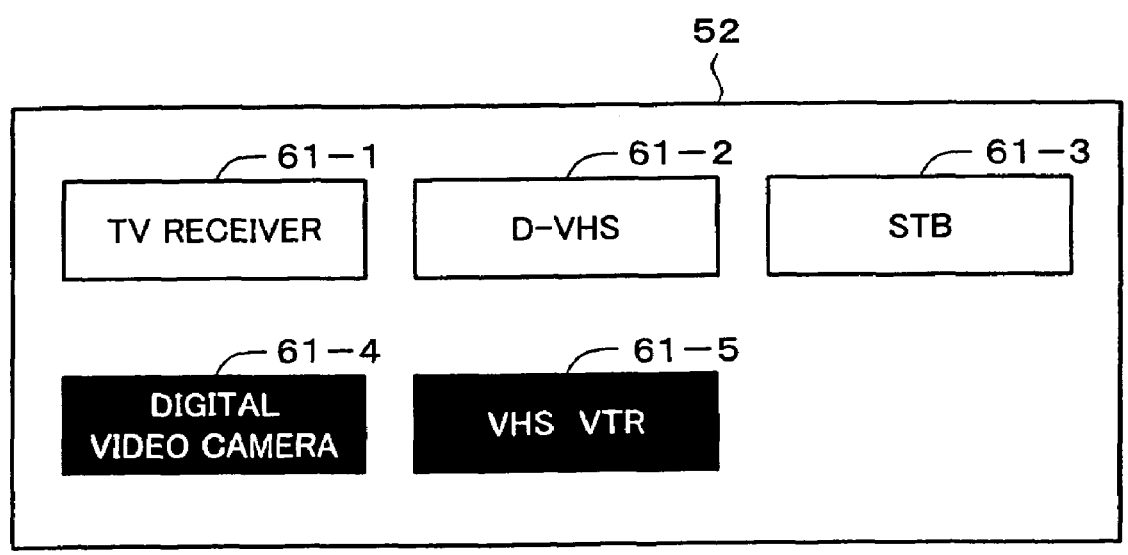
FIG. 7 is a diagram for explaining the icons 61-1 to 61-5 which are displayed on the output unit 52 in FIG. 2.

When the icon of the connection standby mode (icon 61-3 in the example of FIG. 5) among the foregoing icons is clicked, a power-on command is transmitted to the apparatus corresponding to the icon. For example, although the icon 61-3 in FIG. 5 now indicates the connection standby mode, if this icon is clicked by the user, the power-on command is transmitted to the corresponding apparatus (D-VHS 4 in this case). At this time, for a time interval from the transmission of the power-on command to the switching from the mode of the D-VHS 4 to the power-on mode, the control unit 29 of the STB 2 allows a bar graph 71 to be displayed on the output unit 52 (for example, LCD) as shown in FIG. 6(A), thereby enabling the user to confirm the fact that the command has been sent. After completion of the transmission of the command, the bar graph 71 becomes as shown in FIG. 6(B). The icon 61-3 is changed to the normal display as shown in FIG. 7.

Since each digital apparatus is inquired the power supply mode through the IEEE1394 serial bus 11 and the icon corresponding to the power-on mode, connection standby mode, or disconnection mode is displayed as mentioned above, the power source can be easily managed. In case of the connection standby mode, even if the power switch of the apparatus is not directly turned on, by clicking its icon, the power-on command is transmitted. Therefore, the mode can be easily switched even for an apparatus installed at a remote location.

Although the category of the apparatus in the property information stored in the memory table has been displayed on the icon in the above example, according to the invention, the other items such as name of manufacturer, function, node unique ID, and the like can be also displayed. Further, although the icons 61-1 to 61-5 have been normally displayed, mesh-displayed, or inversion-displayed in order to distinguish the modes of the power source, an arbitrary display method can be used so long as three modes of the power source can be distinguished by, for example, colors or the like.

Software to execute the foregoing series of processes is installed from the recording medium into a computer in which a program constructing the software has been built in dedicated hardware or, for example, into a general personal computer or the like in which various functions can be executed by installing various programs.

As shown in FIG. 2, the recording medium is constructed not only by the control unit 29 which is provided for the user in a state where it has previously been built in the STB 2 and in which the program has been recorded but also by a package media comprising the magnetic disk 41 (including a floppy disk), optical disk 42 (including a CD-ROM (Compact Disk-Read Only Memory), DVD (Digital Versatile Disk)), magnetooptic disk 43 (including an MD (Mini-Disk)), semiconductor memory 44, or the like which is distributed to provide the program to the user separately from the computer and in which the program has been recorded.

In the specification, a step of describing the program which is recorded into the recording medium includes not only processes which are time-sequentially executed in the disclosed order but also processes which are executed in parallel or individually even if they are not always time-sequentially executed.

In the specification, the system shows the whole apparatus constructed by a plurality of apparatuses.

Figure 8:
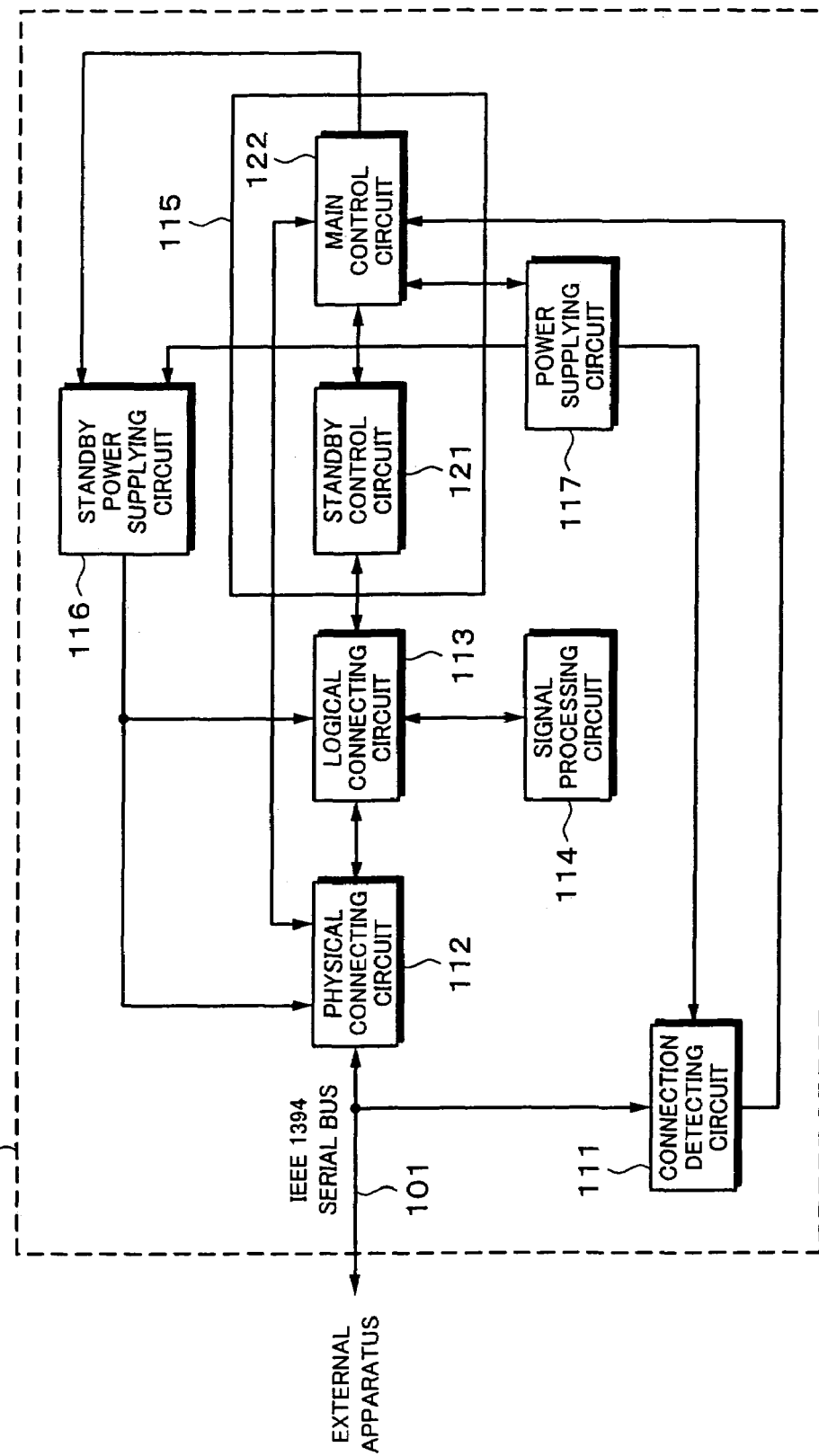
FIG. 8 is a block diagram showing a constructional example of an electronic apparatus to which the invention is applied.

A construction of an electronic apparatus which can reduce a standby electric power in accordance with a connecting state of the bus will now be described with reference to FIG. 8. Although the foregoing STB 2 will be described as an example as an electronic apparatus 102, an apparatus such as television receiver, D-VHS, digital video camera, or the like can be also used. The electronic apparatus 102 is connected to an external apparatus (for example, personal computer) through an IEEE1394 serial bus 101. A plug (not shown) of the IEEE1394 serial bus 101 is connected to a terminal of a physical connecting circuit 112. Thus, in the electronic apparatus 102, a supply of digital data transmitted from the external apparatus through the IEEE1394 serial bus 101 is received by the physical connecting circuit 112 and the digital data is transmitted from the physical connecting circuit 112 to the external apparatus through the IEEE1394 serial bus 101.

A connection detecting circuit 111 detects a bias voltage of the IEEE1394 serial bus 101 and outputs a detection signal to a main control circuit 122 of a control circuit 115. The physical connecting circuit 112 is constructed by, for example, an IEEE1394 digital interface or the like, amplifies the digital data inputted through the IEEE1394 serial bus 101, and outputs it to a logical connecting circuit 113. The physical connecting circuit 112 also amplifies the digital data inputted from the logical connecting circuit 113 and outputs it to the external apparatus through the IEEE1394 serial bus 101.

The logical connecting circuit 113 depacketizes the digital data which was inputted from the physical connecting circuit 112 and has been packetized and multiplexed, thereby separating it into a video signal, an audio signal, and a control signal. The circuit 113 outputs the video signal and audio signal to a signal processing circuit 114 and outputs the control signal to a standby control circuit 121 of the control circuit 115. The logical connecting circuit 113 also executes an addition of an error correction code, a multiplexing process, and the like to the video signal or audio signal inputted from the signal processing circuit 114 and outputs the resultant signal to the physical connecting circuit 112.

The signal processing circuit 114 supplies the inputted video signal and audio signal to built-in video decoder and audio decoder (they are not shown), respectively. The video decoder decodes the inputted video data and outputs it to a CRT (Cathode Ray Tube) (not shown) as necessary. The audio decoder decodes the inputted audio data and outputs it to a speaker (not shown) as necessary. The signal processing circuit 114 also encodes the video signal and audio signal by the built-in video encoder and audio encoder and outputs them to the logical connecting circuit 113.

The standby control circuit 121 outputs a signal corresponding to the control signal inputted from the logical connecting circuit 113 to the main control circuit 122. When a power switch (main power source) of the main body is turned on by the user, the standby control circuit 121 supplies its command (control signal) to the main control circuit 122.

The main control circuit 122 is constructed by, for example, a microcomputer or the like and controls a power supplying circuit 117 so as to supply an electric power to a standby power supplying circuit 116 on the basis of the detection signal inputted from the connection detecting circuit 111. The main control circuit 122 also controls the power supplying circuit 117 so as to supply an electric power to the signal processing circuit 114 on the basis of a command (command to turn on the main power source) from the user.

The standby power supplying circuit 116 supplies a standby electric power to the physical connecting circuit 112, logical connecting circuit 113, and standby control circuit 121 on the basis of a command from the main control circuit 122. When a power plug (not shown) is connected to a power plug terminal of the electronic apparatus 102 and the power switch (not shown) is ON, the power supplying circuit 117 supplies the standby electric power to the connection detecting circuit 111 and main control circuit 122. The power supplying circuit 117 also supplies the electric power to the standby power supplying circuit 116 or signal processing circuit 114 on the basis of a command from the main control circuit 122.

Figure 9:
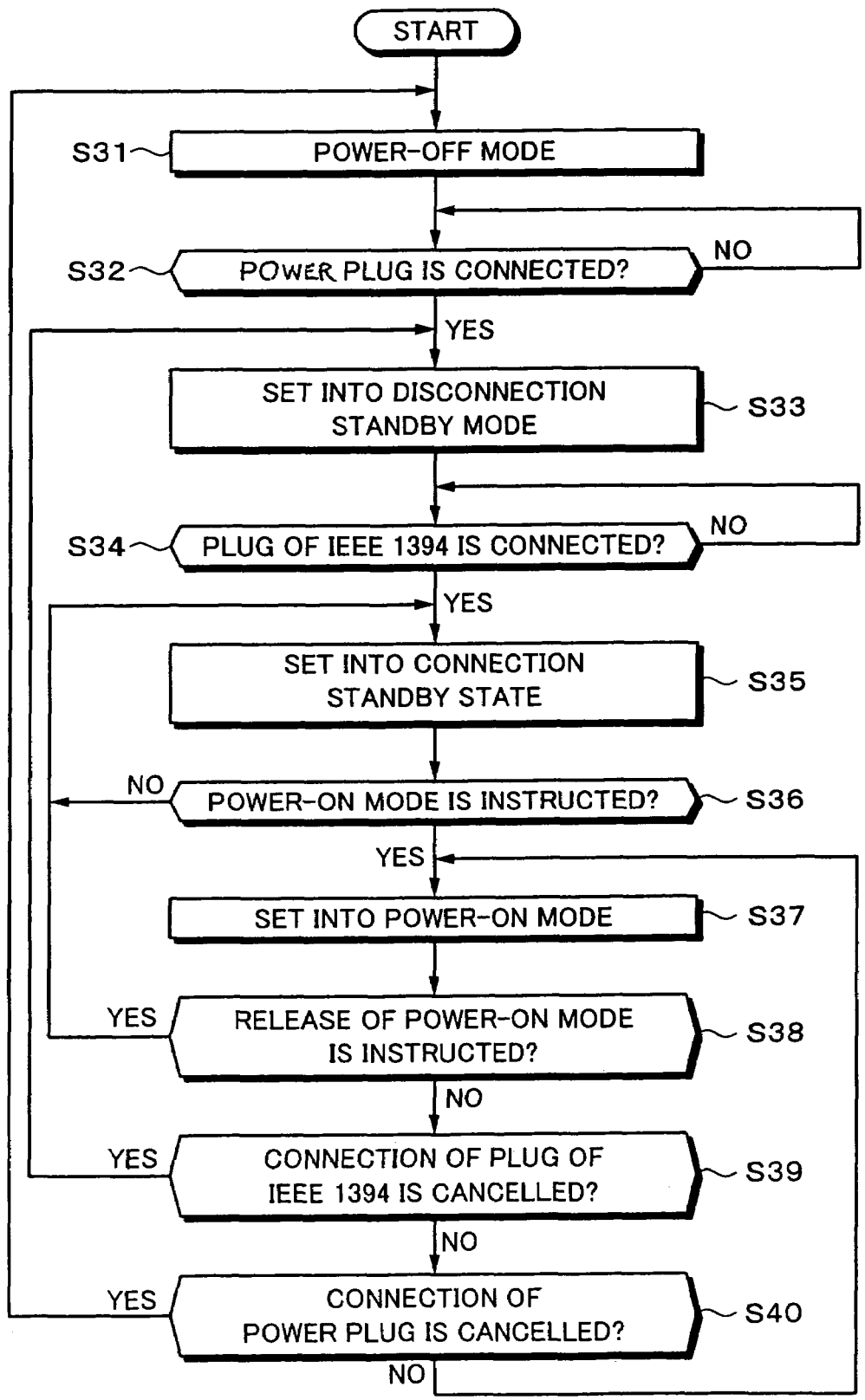
FIG. 9 is a flowchart for explaining processes for supplying an electric power to each circuit in the electronic apparatus in FIG. 8.

A specific example of the operation for detecting the connecting state of the IEEE1394 serial bus 101 and supplying the electric power to each circuit on the basis of its detection result will now be described with reference to a flowchart of FIG. 9.

In step S31, the power supplying circuit 117 sets the mode of the electronic apparatus 102 into a power-off mode. That is, the power supplying circuit 117 does not supply an electric power to all of the circuits (connection detecting circuit 111, physical connecting circuit 112, logical connecting circuit 113, signal processing circuit 114, standby power supplying circuit 116, standby control circuit 121, and main control circuit 122) as shown in FIG. 10(D). In the diagram, o indicates that the electric power is supplied from the power supplying circuit 117 and x denotes that the electric power is not supplied from the power supplying circuit 117. At this time, no electric power is supplied.

In step S32, the power supplying circuit 117 discriminates whether the power plug has been connected to the power plug terminal of the electronic apparatus 102 or not (and whether the main power switch has been turned on or not).

If it is determined that the power plug is not connected, the apparatus waits until it is determined that the power plug has been connected in step S32.

If it is determined that the power plug has been connected (and that the main power switch has been turned on) in step S32, in step S33, the power supplying circuit 117 sets the disconnection standby mode and supplies a standby electric power to the connection detecting circuit 111 and main control circuit 122 (FIG. 10(A)). Thus, when the detection signal showing that the IEEE1394 serial bus 101 has been connected is inputted from the connection detecting circuit 111, the main control circuit 122 can shift the mode of the electronic apparatus 102 from the disconnection (state where the IEEE1394 serial bus 1 is not connected) standby mode to the connection standby mode (standby mode in a state where the IEEE1394 serial bus 1 has been connected). In the disconnection standby mode, since the number of circuits to which the electric power is supplied is smaller than that in the case of the connection standby mode or power-on mode, the electric power consumption can be suppressed by an amount corresponding to it.

In step S34, the connection detecting circuit 111 discriminates whether the plug of the IEEE1394 serial bus 101 has been connected to the physical connecting circuit 112 or not, that is, whether a bias voltage has been detected from the IEEE1394 serial bus 101 or not. If it is determined that the plug of the IEEE1394 serial bus 101 is not connected, the apparatus waits until it is determined that the plug of the IEEE1394 serial bus 101 has been connected.

In step S34, if it is determined that the plug of the IEEE1394 serial bus 101 has been connected, the connection detecting circuit 111 outputs the detection signal to the main control circuit 122. At this time, in step S35, the main control circuit 122 controls the power supplying circuit 117 so as to set the connection standby mode and allows the standby power supplying circuit 116 to supply an electric power. The standby power supplying circuit 116 supplies a standby electric power to the physical connecting circuit 112, logical connecting circuit 113, and standby control circuit 121 on the basis of a command from the main control circuit 122 (FIG. 10(B)).

Thus, for example, when the power-on command is sent from the external apparatus through the IEEE1394 serial bus 101 or the self sub power switch is turned on, the electronic apparatus 102 (main control circuit 122) can be set to the power-on mode. Although in the connection standby mode, an electric power larger than that in the disconnection standby mode is consumed, an electric power smaller than that in the power-on mode is consumed.

In step S36, the main control circuit 122 discriminates whether the user turns on the sub power switch or the command of the power-on mode has been sent from the external apparatus and the power-on mode has been instructed or not. If it is determined that the power-on mode is not instructed, the processing routine is returned to step S35 and the foregoing processes are repeated. If it is determined in step S36 that the power-on mode has been instructed, the main control circuit 122 controls the power supplying circuit 117 so as to supply an electric power to the signal processing circuit 114 in step S37 (FIG. 10(C)), thereby shifting the mode of the electronic apparatus 102 (the mode is at present the connection standby mode) to the power-on mode. At this time, although the largest electric power is consumed, the electronic apparatus 102 enters a state where all of the processes can be performed.

In step S38, the power supplying circuit 117 discriminates whether the release of the power-on mode has been instructed from an external apparatus or the self sub power switch has been operated and such a release has been instructed or not. If the release is instructed, the processing routine is returned to step S35 and the mode is shifted to the operation standby mode. Further, the processing routine advances to step S36 and the foregoing subsequent processes are executed. If the release of the power-on mode is not instructed, step S39 follows. The connection detecting circuit 111 discriminates whether the connection of the plug of the IEEE1394 serial bus 101 has been released or not, that is, whether no bias voltage is detected from the IEEE1394 serial bus 101 or not. If it is decided that the connection of the plug of the IEEE1394 serial bus 101 is not released, step S40 follows and the power supplying circuit 117 discriminates whether the connection of the power plug has been released or not. If it is determined that it is not released, the processing routine is returned to step S37 and the foregoing processes are repeated.

If it is decided in step S39 that the connection of the plug of the IEEE1394 serial bus 101 has been released, the main control circuit 122 returns to step S33 and shifts the mode of the electronic apparatus 102 (the mode is at present the power-on mode) to the disconnection standby mode. Further, step S34 follows and the foregoing subsequent processes are repeated. If it is decided in step S40 that the connection of the power plug has been released, the main control circuit 122 returns to step S31 and shifts the mode of the electronic apparatus 102 (the mode is at present the power-on mode) to the power-off mode. Further, step S102 follows and the foregoing subsequent processes are repeated.

As mentioned above, when the main power switch is turned on, to detect the bias voltage of the IEEE1394 serial bus 101, the standby electric power is supplied to the connection detecting circuit 111 and main control circuit 122. Thus, when the plug of the IEEE1394 serial bus 101 is connected to the terminal of the physical connecting circuit 111, the connection detecting circuit 111 detects the bias voltage. The main control circuit 122 receives the input of the detection signal and controls the power supplying circuit 117 so as to supply an electric power to the standby power supplying circuit 116. The standby power supplying circuit 116 further supplies a standby electric power to the physical connecting circuit 112, logical connecting circuit 113, and standby control circuit 121. Therefore, the electric power can be supplied only to a predetermined circuit in accordance with the connecting state of the bus.

Although the case of detecting the bias voltage of the IEEE1394 serial bus 101 in order to detect the connection standby mode of the bus has been described above as an example, the invention can be also constructed in a manner such that a contact to observe the conduction of a shield outside of the plug of the IEEE1394 serial bus 101 is provided on the reception side of the plug and the connection standby mode (the plug has been connected) is physically detected.

Although the case of detecting the connecting state of the IEEE1394 serial bus 101 has been described above as an example, the invention can be also applied to a case of detecting a connecting state of another bus.

As mentioned above, according to the information processing apparatus and the power control method of the invention, since the connecting state of the bus is detected and the electric power is supplied to a predetermined circuit based on the detection result, the waste standby electric power can be reduced.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing apparatus connectable to a bus, the bus being connected to a further apparatus, said information processing apparatus comprising:
a detecting circuit operable to detect whether the bus is connected to said information processing apparatus;
a control circuit;
a first circuit; and
a second circuit;
said control circuit being operable to control a power supply circuit such that (i) when said information processing apparatus is in a standby mode and said detecting circuit detects that the bus is connected to said information processing apparatus, the power supply circuit provides power to said first circuit and does not provide power to said second circuit, (ii) when said information processing apparatus is in the standby mode and said detecting circuit detects that the bus is not connected to said information processing apparatus, the power supply circuit does not provide power to said first circuit and does not provide power to said second circuit, (iii) when said information processing apparatus is in a power-on mode and said detecting circuit detects that the bus is connected to said information processing apparatus, the power supply circuit provides power to said first circuit and to said second circuit, and (iv) when said information processing apparatus is in the power-on mode and said detecting circuit detects that the bus is not connected to said information processing apparatus, said information processing apparatus returns to the standby mode and the power supply circuit does not provide power to said first circuit and does not provide power to said second circuit.

2. An information processing apparatus according to claim 1, wherein said detecting circuit is operable to detect whether the bus is connected to said information processing apparatus by detecting a bias voltage.

3. An information processing apparatus according to claim 1, wherein said detecting circuit is further operable to send a detection signal to said control circuit when said detecting circuit detects that the bus is connected to said information processing apparatus.

4. An information processing apparatus according to claim 1, wherein said information processing apparatus includes said power supply circuit.

5. An information processing apparatus according to claim 1, wherein said first circuit includes at least one circuit selected from the group consisting of: a physical connecting circuit operable to receive incoming data from the bus and to transmit outgoing data to the bus, a logical connecting circuit operable to convert the incoming data into an incoming signal and to convert an outgoing signal into the outgoing data, and a standby control circuit operable to receive at least part of the incoming signal and to output a signal corresponding to the part of the incoming signal to said control circuit.

6. An information processing apparatus according to claim 5, wherein the bus is an IEEE1394 serial bus, and said physical connecting circuit is an IEEE1394 interface.

7. An information processing apparatus according to claim 5, wherein said logical connecting circuit is operable to convert the incoming data into a video signal, an audio signal, and a control signal.

8. An information processing apparatus according to claim 7, wherein said second circuit includes a signal processing circuit operable to process the video signal and the audio signal, and said control circuit is further operable to control the power supply circuit such that the power supply circuit provides power to said signal processing circuit when said information processing apparatus is in the standby mode and said control circuit receives an instruction to initiate the power-on mode, and the power supply circuit terminates the power to said signal processing circuit when said information processing apparatus is in the power-on mode and said control circuit receives an instruction to terminate the power-on mode.

9. An information processing apparatus according to claim 1, wherein said first circuit includes a standby control circuit operable to receive a control signal and to output a signal corresponding to the control signal.

10. A method of controlling power within an information processing apparatus that is connectable to a bus, the bus being connected to a further apparatus, said method comprising:
detecting whether the bus is connected to the information processing apparatus; and
controlling a power supply circuit such that (i) when the information processing apparatus is in a standby mode and the bus is detected as being connected to the information processing apparatus, the power supply circuit provides power to a first circuit located within the information processing apparatus and does not provide power to a second circuit located within the information processing apparatus, (ii) when the information processing apparatus is in the standby mode and the bus is detected as not being connected to the information processing apparatus, the power supply circuit does not provide the power to the first circuit and does not provide power to the second circuit, (iii) when the information processing apparatus is in a power-on mode and the bus is detected as being connected to the information processing apparatus, the power supply circuit provides power to the first circuit and to the second circuit, and (iv) when the information processing apparatus is in the power-on mode and the bus is detected as not being connected to the information processing apparatus, the information processing apparatus returns to the standby mode and the power supply circuit does not provide power to said first circuit and does not provide power to said second circuit.

11. A method according to claim 10, wherein said detecting step includes detecting a bias voltage.

12. A method according to claim 10, further comprising generating a detection signal when said detecting step detects that the bus is connected to the information processing apparatus.

13. A method according to claim 10, wherein when power is provided to the first circuit, the first circuit carries out a further step that includes at least one step selected from the group consisting of: receiving incoming data from the bus, converting the incoming data into an incoming signal, generating a signal corresponding to a part of the incoming signal, converting an outgoing signal into outgoing data, and transmitting the outgoing data to the bus.

14. A method according to claim 13, wherein the incoming data is converted into a video signal, an audio signal, and a control signal.

15. A method according to claim 14, wherein when power is provided to the second circuit, the second circuit carries out a further step that includes processing the video signal and the audio signal, and said method further comprising providing power to the second circuit located to process the video signal and the audio signal when the information processing apparatus is in the standby mode and an instruction to initiate the power-on mode is received, and terminating the power to the second circuit when the information processing apparatus is in the power-on mode and an instruction to terminate the power-on mode is received.

16. A method according to claim 10, wherein when power is provided to the first circuit, the first circuit carries out a further step that includes generating a signal corresponding to a control signal.

17. A recording medium recorded with a program for carrying out a method of controlling power within an information processing apparatus that is connectable to a bus, the bus being connected to a further apparatus, said method comprising:

detecting whether the bus is connected to the information processing apparatus; and controlling a power supply circuit such that (i) when the information processing apparatus is in a standby mode and the bus is detected as being connected to the information processing apparatus, the power supply circuit provides power to a first circuit located within the information processing apparatus and does not provide power to a second circuit located within the information processing apparatus, (ii) when the information processing apparatus is in the standby mode and the bus is detected as not being connected to the information processing apparatus, the power supply circuit does not provide the power to the first circuit and does not provide power to the second circuit, (iii) when the information processing apparatus is in a power-on mode and the bus is detected as being connected to the information processing apparatus, the power supply circuit provides power to the first circuit and to the second circuit, and (iv) when the information processing apparatus is in the power-on mode and the bus is detected as not being connected to the information processing apparatus, the information processing apparatus returns to the standby mode and the power supply circuit does not provide power to said first circuit and does not provide power to said second circuit.

18. A recording medium according to claim 17, wherein said detecting step includes detecting a bias voltage.

19. A recording medium according to claim 17, wherein said method further comprises generating a detection signal when said detecting step detects that the bus is connected to the information processing apparatus.

20. A recording medium according to claim 17, wherein when power is provided to the first circuit, the first circuit carries out a further step that includes at least one step selected from the group consisting of: receiving incoming data from the bus, converting the incoming data into an incoming signal, generating a signal corresponding to a part of the incoming signal, converting an outgoing signal into outgoing data, and transmitting the outgoing data to the bus.

21. A recording medium according to claim 20, wherein the incoming data is converted into a video signal, an audio signal, and a control signal.

22. A recording medium according to claim 21, wherein when power is provided to the second circuit, the second circuit carries out a further step that includes processing the video signal and the audio signal, and said method further comprises providing power to the second circuit located to process the video signal and the audio signal when the information processing apparatus is in the standby mode and an instruction to initiate the power-on mode is received, and terminating the power to the second circuit when the information processing apparatus is in the power-on mode and an instruction to terminate the power-on mode is received.

23. A recording medium according to claim 20, wherein when power is provided to the first circuit, the first circuit carries out a further step that includes generating a signal corresponding to a control signal.

* * * * *